Patented May 30, 1933

1,912,260

UNITED STATES PATENT OFFICE

KARL DACHLAUER AND CHRISTOPH THOMSEN, OF HOCHST-ON-THE-MAIN, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

WATER SOLUBLE CONDENSATION PRODUCT AND PROCESS FOR PREPARING THE SAME

No Drawing. Application filed April 15, 1926, Serial No. 102,331, and in Germany April 23, 1925.

We have found that aromatic hydroxy alcohols including derivatives and substitution products thereof, can be condensed with aromatic sulfonic acids by a very simple and easy method which permits working at temperatures up to 100° C. and above and in certain cases, in presence of strong mineral acids. Various methods may be employed for the manufacture of the said, hitherto unknown, compounds, which possess very valuable properties and can be used for instance as tanning substances, frothing and emulsifying agents, intermediate products for making dyestuffs etc. They are also capable of producing on the animal fibre efficient resists against dyestuffs. Products of the said kind may also be obtained by condensing aromatic sulfonic acids with mixtures of hydroxy alcohols and other compounds suitable for the condensation process—such as aliphatic, aromatic or hydroaromatic alcohols, phenols or compounds with replaceable halogen atoms (benzylchloride, dichlorhydronaphthalene, benzoylchloride, ethyl chloride or the like). Or there may be used as starting material higher molecular aromatic sulfonic acids, obtainable, for instance, by condensation of aromatic sulfonic acids with aldehydes or compounds capable of splitting off aldehyde, or with any other compounds capable of condensing with the aromatic nucleus with formation of —C— or —S— linkages. Instead of using for the reaction mixtures of hydroxy alcohols and the above specified compounds, it may sometimes be advantageous to effect the condensation with the several components in a determined order of succession. Compounds of valuable properties may also be obtained by subsequent condensation of products, which, according to our inventive idea, are produced, for instance, from aromatic sulfonic acids and hydroxy alcohols, with nucleus binding compounds (aldehydes, sulfuryl chlorides etc.). Instead of the aromatic sulfonic acids or aromatic hydroxy alcohols above referred to, there may, as is obvious to every chemist, also be used the derivatives and substitution products of these compounds.

The following examples serve to illustrate our invention all parts being by weight.

(1) 10 parts of naphthalene are sulfonated with 16 parts of sulfuric acid (98%) at 160° C. Into the mixture when it has cooled to the temperature of the water bath, are run, while vigorously stirring, 19,4 parts of hydroxybenzyl alcohol. After the latter is completely introduced, the whole is again stirred for a short time in order to accomplish the reaction.

The condensation product is to be treated with caustic soda solution of 20% strength until it has an acidity such that 1 gram is equivalent to 10 ccm. of n/10 NaOH. The water solution can be used for tanning purposes. It makes leather white and very soft and imparts to it a feel like kid-leather.

Instead of hydroxybenzyl alcohol there may be used other hydroxy alcohols, for instance alcohols produced from cresol.

(2) 10 parts of naphthalene are sulfonated according to the indications contained in German Patent No. 292,531 with 12,5 parts of sulfuric acid (98%) at 130–140° and then condensed with 4 parts of formaldehyde of 30% strength at 80° C. Towards the end of the reaction so much of sulfuric acid (70%) is added that the mass can still be easily stirred, whereupon 9,7 parts of p-homo-saligenin are run into it at water-bath temperature. After having again stirred for a short time, the reaction is complete. The product thus obtained is soluble in water to a clear solution and after being treated with caustic soda solution of 20% strength until it has an acidity such that 1 gram is equivalent to 10 ccm. of n/10 NaOH, it yields a tanning substance which makes leather soft and white. This product is considerably superior to the dinaphthylmethane-disulfonic acid as regards its tanning effect.

(3) Into the sulfonation mixture prepared according to Example 1 from 10 parts of naphthalene and 16 parts of sulfuric acid are run at water-bath temperature, while well stirring, 21,5 parts of hydroxyphenylethyl alcohol. After having again stirred the mass for a short time, the reaction is complete and the resulting solution after it has been neutralized with caustic soda solution of 20% strength until it has an acidity such that 1 gram is equivalent to 8 ccm. of n/10 NaOH, can be directly used as tanning liquor.

(4) 11 parts of methylnaphthalene are converted by means of 16 parts of sulfuric acid (98%) at 120° C. into methylnaphthalene sulfonic acid and then condensed at water-bath temperature, while well stirring, with 19,4 parts of hydroxybenzyl alcohol. The condensation product, after being neutralized until it has an acidity such that 1 gram is equivalent to 10 ccm. of n/10 NaOH, constitutes a valuable tanning material.

(5) Into the sulfonation mixture prepared according to Example 1 from 10 parts of naphthalene and 12 parts of sulfuric acid (98%) is run at water-bath temperature, while well stirring, a mixture of 9,7 parts of p-homosaligenin and 7,3 parts of phenol. After the main reaction has taken place, the mass is heated for a short time to a somewhat higher temperature in order to complete the reaction.

Thus a condensation product is obtained which, after being neutralized with caustic soda solution of 20% strength until it has an acidity such that 1 gram is equivalent to 10 ccm. of n/10 NaOH, can be used as a tanning liquor.

(6) 64 parts of naphthalene are condensed with 63 parts of benzyl chloride and sulfonated with a mixture of 28 parts of oleum (20%) and 75 parts of chlorosulfonic acid at 80–90°.

10 parts of the resulting mixture are condensed with 3,3 parts hydroxybenzyl alcohol at 95°. After being neutralized with caustic soda solution of 20% strength until it has an acidity such that 1 gram is equivalent to 10 ccm. of n/10 NaOH, the resulting product is soluble in water to a perfectly clear solution which can be used for tanning purposes. The leather prepared therewith is white, soft and full bodied.

(7) Into a mixture of 12,8 parts of naphthalene and 4,6 parts of ethyl alcohol are slowly introduced by drops at 70° C. 30 parts of chlorsulfonic acid. After having continued the stirring of the mass for a prolonged time at 100–120° C. the condensation is complete. Into 10 parts of the resulting mixture are then run at 95–100° C. 3,3 parts of hydroxybenzyl alcohol. The product is partly neutralized with caustic soda solution of 20% strength until it has an acidity such that 1 gram is equivalent to 11 ccm. of n/10 NaOH and is then suitable for the preparation of a good leather.

(8) 12,8 parts of naphthalene are condensed with 12,6 parts of benzylchloride to which 0,002 part of crude zinc dust has been added and the mass is then sulfonated at 90–100° with 17 parts of oleum of 20% strength. Into the sulfonation mixture is run at about 100° C., while well stirring, a mixture of 10,8 parts of methylhydroxybenzyl-alcohol

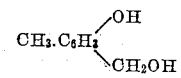

and 2,4 parts of hydroxybenzyl-alcohol.

When the condensation is complete, the product is treated with caustic soda solution of 20% strength until it has an acidity such that 1 gram is equivalent to 10 ccm. of n/10 NaOH; it is suitable for tanning purposes.

(9) 38,4 parts of naphthalene are condensed at 170–190° with 42 parts of benzoylchloride to which is added about 0,05 parts of crude zinc dust (at 170–190°). The condensation product is fractionated in vacuo under 37 mm. pressure. 17,0 parts of the fraction distilling over at 150–210°, are sulfonated with 22,4 parts of oleum (20%) at 140° and then condensed at 100° C., while well stirring, with 9,1 parts of hydroxybenzylalcohol.

After the product has been treated with caustic soda solution of 40% strength until it has an acidity such that 1 gram is equivalent to 7 ccm. of n/10 NaOH, it can be used for tanning purposes.

(10) 8,8 parts of tetrahydronaphthaline are sulfonated with 12 parts of sulfuric acid (98%) at 100° and then condensed with a mixture of 7,1 parts of methylhydroxybenzyl alcohol

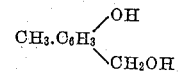

and 1,6 parts of hydroxybenzyl alcohol at a like temperature. After the product has been treated with caustic soda solution of 20% strength until it has an acidity such that 1 gram is equivalent to 10 ccm. of n/10 NaOH, it can be used for tanning purposes.

(11) 7,8 parts of the sulfonation-mixture, obtained according to Example 10, from tetrahydronaphthaline and sulfuric acid, are mixed with 2,5 parts of sulfuric acid (80%) and condensed at 100° C. with 9,3 parts of hydroxybenzyl alcohol. The product, after being treated with caustic soda solution of 20% strength until it has an acidity such that 1 gram is equivalent to 5ccm. of n/10 NaOH, is ready for use as tanning material.

(12) 25 parts of the sulfonation mixture of naphthalene and sulfuric acid are condensed first with 5,0 parts of cyclohexanol at 120° C. and then with 12,2 parts of hydroxybenzyl-alcohol at 100° C. After the product has been treated with caustic soda solution of 20% strength until it has an acidity of about such that 1 gram is equivalent to 10 ccm. of n/10 NaOH, it is ready for use as tanning material.

(13) Into 31,3 parts of the sulfonation mixture, obtained according to Example 10 from tetrahydronaphthalene and sulfuric acid, chlorine is introduced until the weight of the mixture has increased by 2,9 parts.

8,0 parts of the resulting chlorination-mixture are condensed with 6,2 parts of hydroxybenzyl alcohol and the product is treated with caustic soda solution of 20% strength until it has an acidity such that 1 gram is equivalent to 10 ccm. of n/10 NaOH, whereupon it can be used for tanning purposes.

(14) 16,3 parts of α-chlornaphthalene are sulfonated with 25,5 parts of oleum of 5% strength at 150° C. and then condensed at 100° with 12,4 parts of hydroxybenzyl alcohol. After the product has been treated with caustic soda solution of 20% strength until it has an acidity such that 1 gram is equivalent to 10 ccm. of n/10 NaOH, it can be used as tanning material.

(15) 25 parts of the sulfonation mixture obtained according to Example 1 from naphthalene and sulfuric acid are first condensed with 3,0 parts of isopropyl alcohol at 100° and then with 12,2 parts of hydroxybenzyl alcohol at a like temperature.

After the product has been treated with caustic soda solution of 20% strength until it has an acidity such that 1 gram is equivalent to 10 ccm. of n/10 NaOH it can be used as tanning material.

(16) 25 parts of benzene are run into 70 parts of sulfuric acid of 100% strength, while stirring, and the mixture is finally heated to 100° C., 20 parts of this mixture are condensed at 100° C. with 16,4 parts of hydroxybenzyl alcohol and treated with caustic soda solution of 20% strength until, it has an acidity such that 1 gram is equivalent to 9 ccm. of n/10 NaOH. The product can be used for tanning purposes.

(17) 22,6 parts of crystallized naphthalenesulfonic acid are condensed with 6,8 parts of sulfur mono-chloride at 100° C. and mixed and stirred with 10,6 parts of sulfuric acid (95%) 18 parts of this mixture are condensed at 100° C. with 6,2 parts of hydroxybenzyl alcohol and treated with caustic soda solution of 20% strength until it has an acidity such that 1 gram is equivalent to 9 ccm. of n/10 NaOH; it can then be used as a tanning material.

(18) 10 parts of the residual mass, obtained during the process of purifying anthracene, are sulfonated with 15 parts of concentrated sulfuric acid at 140° C. and condensed at 100° C. with 7 parts of hydroxybenzyl alcohol. The product is treated with caustic soda solution of 20% strength until it has an acidity such that 1 gram is equivalent to 10 ccm. of n/10 NaOH, whereupon it can be used for tanning purposes.

We claim:

1. Process for preparing water-soluble condensation products which consists in condensing aromatic hydroxy alcohols with aromatic sulfonic acids of the type R.SO₃H, "R" standing for a hydrocarbon radical.

2. Tetrahydronaphthalene sulfonic acid compounds of the following formula

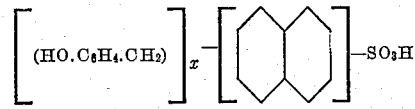

in which $x$ stands for a number from 1 to 5, inclusive, said products being capable of converting hides into well-plumped leather.

3. Water-soluble aromatic sulfonic acid compounds of the following formula:

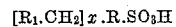

in which R constitutes an aromatic radical, and $R_1$ constitutes an aromatic radical containing at least one hydroxyl group, and in which $x$ stands for the number from 1–5 inclusive, said products being capable of converting hides into well-plumped leather.

4. Water-soluble tetrahydronaphthalene sulfonic acid compounds of the following formula:

in which R constitutes an aromatic radical containing at least one hydroxyl group and in which $x$ stands for the number from 1–5 inclusive, said products being capable of converting hides into well-plumped leather.

In witness whereof, we affix our signatures.

KARL DACHLAUER.
CHRISTOPH THOMSEN.